(12) United States Patent  (10) Patent No.: US 8,180,292 B2
Yuki et al.  (45) Date of Patent: May 15, 2012

(54) MOBILE COMMUNICATION DEVICE

(75) Inventors: Yoshinori Yuki, Tokyo (JP); Toshiya Tamura, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 969 days.

(21) Appl. No.: 11/384,900

(22) Filed: Mar. 20, 2006

(65) Prior Publication Data

US 2006/0240778 A1  Oct. 26, 2006

(30) Foreign Application Priority Data

Apr. 26, 2005 (JP) ................................. 2005-127516

(51) Int. Cl.
*H04B 7/00* (2006.01)
(52) U.S. Cl. ...................... 455/41.2; 455/403; 455/456.2
(58) Field of Classification Search .................. 455/41.2, 455/403, 456.2
See application file for complete search history.

(56) References Cited

U.S. PATENT DOCUMENTS

| 7,076,269 | B2* | 7/2006 | Konishi et al. ............. | 455/552.1 |
| 2004/0224631 | A1* | 11/2004 | Davis et al. ................. | 455/11.1 |
| 2008/0051031 | A1* | 2/2008 | Itoh et al. .................... | 455/41.2 |

FOREIGN PATENT DOCUMENTS

| JP | 2002-261686 A | | 9/2002 |
| JP | 2005-065102 A | | 3/2005 |
| WO | WO2004/105324 | * | 12/2004 |

OTHER PUBLICATIONS

Japanese Office Action dated May 8, 2009 and English translation thereof issued in a counterpart Japanese Application No. 2005-127516.

* cited by examiner

*Primary Examiner* — Lana N Le
*Assistant Examiner* — Hsin-Chun Liao
(74) *Attorney, Agent, or Firm* — Maschoff Gilmore & Israelsen

(57) ABSTRACT

A mobile communication device for communicating a radio communication device associated with a radio transmitter. The mobile communication device includes a short-range radio communication unit configured to transmit a requirement signal for short-range radio communication connection to the radio communication device, and configured to receive a signal from the radio communication device for short-range radio communication connection. The mobile communication device includes a memory configured to store a data, the data needed to transmit the requirement signal. The mobile communication device includes a controller coupled to the short-range radio communication unit and the memory, and configured to wait for the signal from the radio communication device if the short-range radio communication unit tries to transmit the requirement signal to the radio communication device, and if a connection between the mobile communication device and the radio communication device has failed.

16 Claims, 13 Drawing Sheets

MOBILE COMMUNICATION DEVICE

CROSS-REFERENCE TO RELATED APPLICATIONS

This application is based upon and claims the benefit of priory from the prior Japanese Paten Application No. 2005-127516 filed Apr. 26, 2005; the entire contents of which are incorporated herein by reference.

FIELD OF THE INVENTION

The present invention relates to a portable communication device, and more particularly to a portable communication devices equipped with Bluetooth™.

BACKGROUND OF THE INVENTION

Remarkable progress has been achieved in the field of portable information devices, and this progress has been spreading into society in recent years. In particular, cellular phones provided with a variety of functions started appearing on the market, and cellular phones equipped with Bluetooth (registered trademark, abbreviated as "BT") are no exception.

For BT communication systems, Japanese Patent Application Laid-open No. 2002-261686, for example, suggested a wireless communication method for a BT communication system in which an electronic device (for example, a cellular phone) equipped with BT searches BT devices located in its neighborhood and takes an electronic device (for example, a headphone) selected from a plurality of discovered devices as an object to which the communication is to be connected.

In the following description, in a procedure for establishing BT communication, an apparatus which issues a processing request necessary for establishing the connection for communication or the operation of such an apparatus will be referred to as "client", and an apparatus which receives the request of the client and outputs processing results necessary for establishing the connection for the communication or the operation of such an apparatus will be referred to as "server".

SUMMARY OF THE INVENTION

For example, to establish BT connection (hereinafter, referred to as BT-AV connection) between BT-based electronic devices and electronic devices connectable to BT (hereinafter, referred to as BT-AV devices), an operation for establishing BT-AV connection must first be performed. However, if a desired BT-AV device being connected is at power-off, the connection is not allowed. Accordingly, the connecting operation of the client must temporarily be stopped, and then started again after the power of the server is turned on (after the server is brought into standby state). This operation is complicated and, in particular, it is difficult for beginners of BT.

Furthermore, the client and the server must be switched manually to establish the connection from BT-based electronic devices to BT-AV devices. Also, the actions of the client and the server are independent and as such, if connection by one of the actions fails, the action must be switched to the other action by hand.

Accordingly, it is desirable to allow users to connect to other communication devices via Bluetooth without consciousness about difference between the server and the client.

BRIEF DESCRIPTION OF THE DRAWINGS

In the accompanying drawings.

DETAILED DESCRIPTION OF THE INVENTION

Embodiment relating to the case where the present invention is employed in a cellular phone will be explained hereinbelow with reference to the accompanying drawings.

Figure 1A:
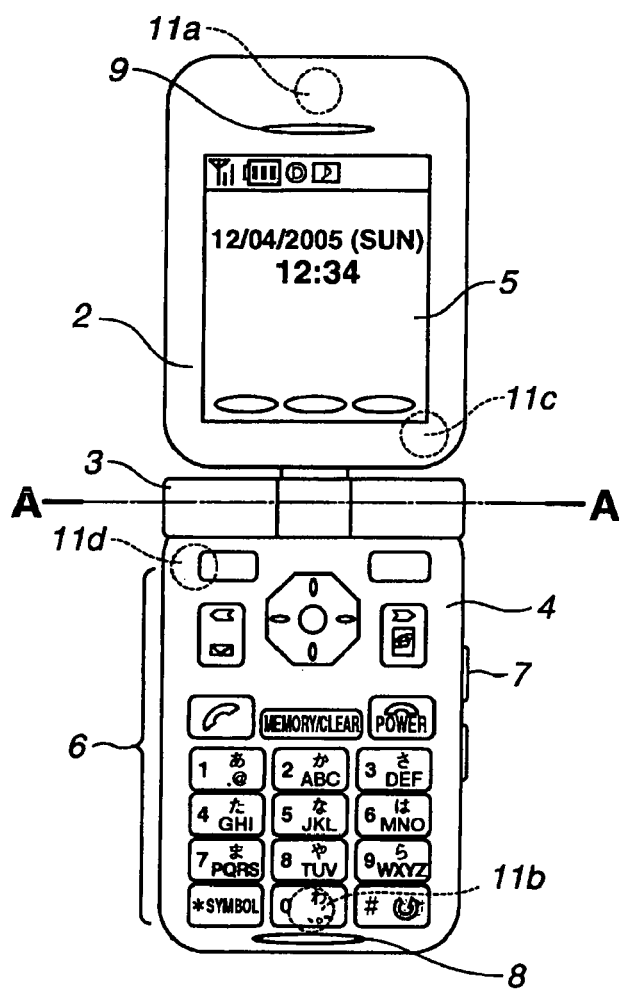
FIGS. 1A and 1B show an external appearance of the cellular phone 1 according to an embodiment of the present invention when the cellular phone 1 is opened to about 180 degrees.
Figure 1B:
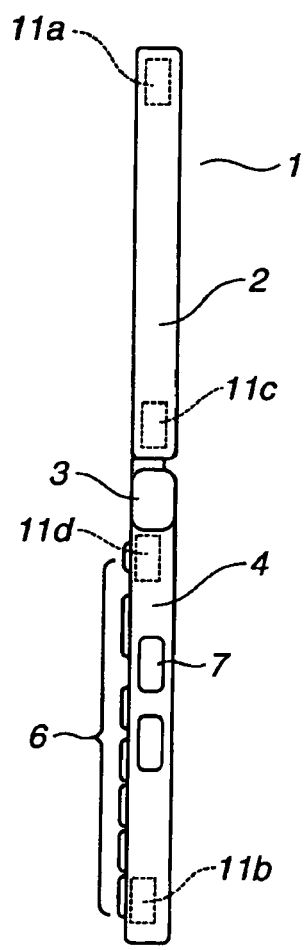
Figure 2A:
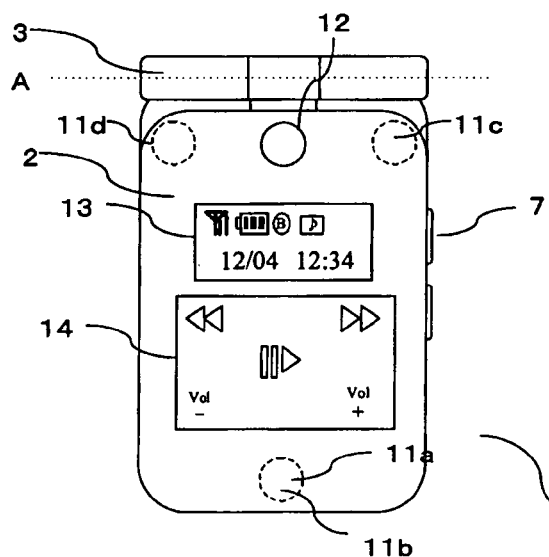
FIGS. 2A and 2B show an external appearance of the cellular phone 1 of the embodiment when the cellular phone 1 is closed.
Figure 2B:
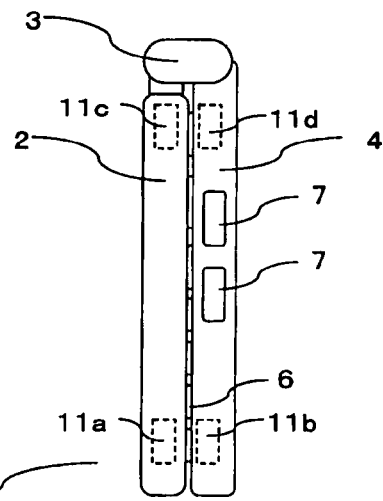

First, the structure of the cellular phone 1 will be explained referring to FIG. 1 and FIG. 2. FIG. 1 shows an external appearance of the cellular phone 1 opened to about 180 degrees in which FIG. 1A is a front view thereof, and FIG. 1B is a side view thereof. FIG. 2 shows the cellular phone 1 in closed state in which FIG. 2A is a front view thereof, and FIG. 2B is a side view thereof.

The cellular phone 1 has an upper case section 2 and a lower case section 4 which are connected to the upper section 2 via a hinge 3. The upper case section 2 has a display 5 such as an LCD, a receiver 9 for playing a sound of received voice, magnetic sensors 11a, 11c for detecting the state of the cellular phone 1, a camera 12, a sub-display 13 such as an LCD, and an electrostatic touch pad 14. The display 5, camera 12, and electrostatic touch pad 14 are provided on the same surface of the upper case section 2.

The lower case section 4 has digit/letter keys 6 for inputting, e.g., digits, letters or operations of the cellular phone 1, side keys 7 for conducting operations of the cellular phone 1, a microphone (mouthpiece) 8 for sound collection, and magnetic sensors 11b, 11d for detecting the state of the cellular phone 1.

Figure 4:
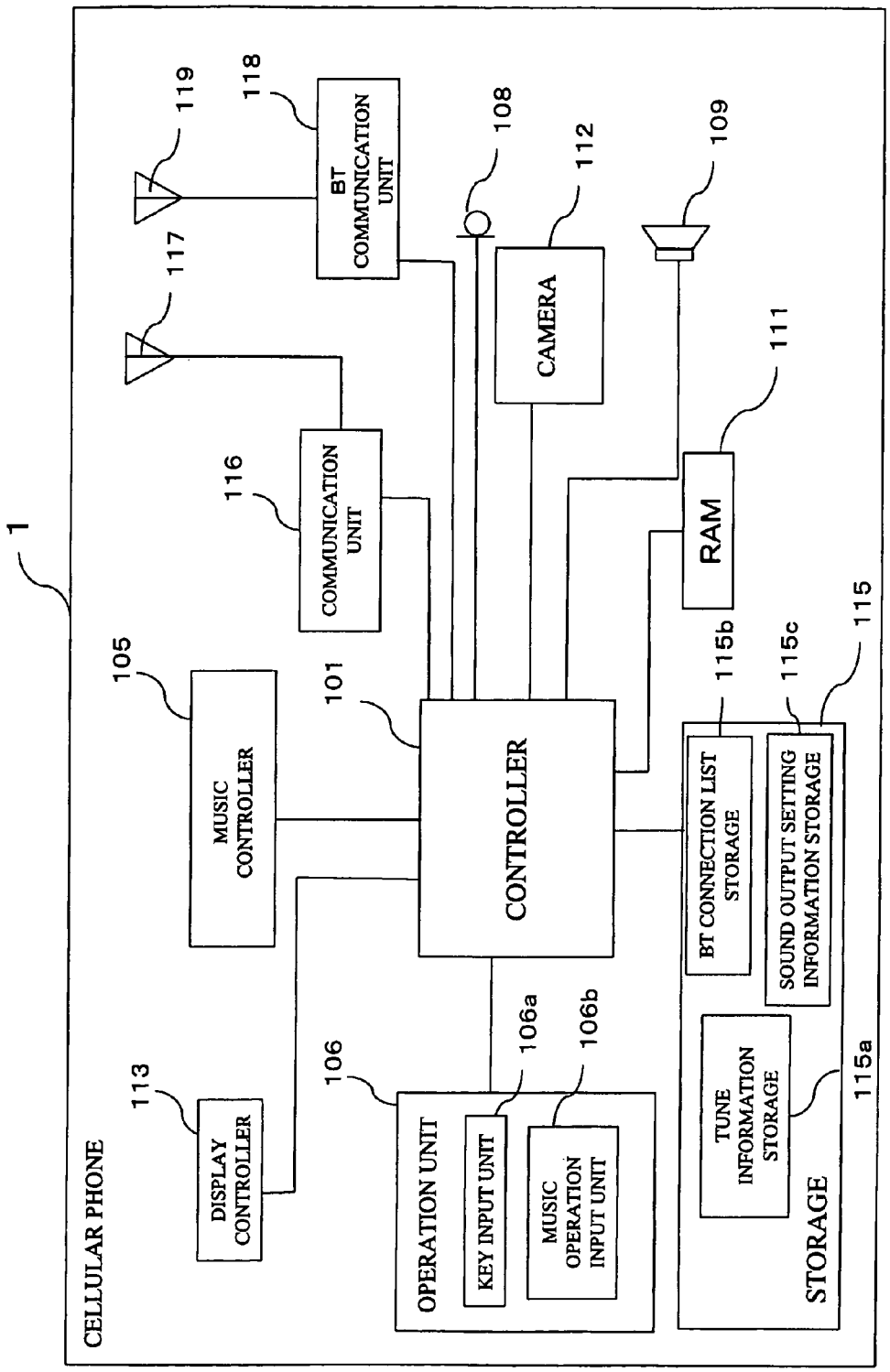
FIG. 4 is a block diagram illustrating in a simple manner the configuration of the cellular phone 1 of the embodiment.

FIG. 4 is a block diagram illustrating the configuration of the cellular phone 1.

The cellular phone 1 has inside thereof a controller 101 for conducting control of the entire cellular phone 1, a microphone controller 108, a speaker 109, a camera controller 112 for controlling the camera 12, a nonvolatile storage 115 comprising a ROM or a NAND memory, a volatile RAM 111 for temporary storage, a display controller 113 for display controlling the display 5 and sub-display 13, an operation unit 106 for recognizing that the keys 6, side keys 7, and electrostatic touch pad 14 have been pushed down, a communication unit 116 for conducting wireless communication control by using an antenna 117, a BT communication unit 118 for conducting wireless communication control by using a BT antenna 119, and a music controller 105 for conducting, e.g., music reproduction by using music information stored in the storage 115. The entire system is controlled by the controller 101.

The storage 115 stores a program executed by the controller 101 and various information data, and has a tune information storage 115a which stores musical tune information, a BT connection list storage 115b which stores a list for which the BT connection is possible, and a sound output setting information storage 115c for storing settings of output destination for conducting sound output during tune reproduction.

The display controller 113 controls the display 5 and sub-display 13 and display controls the display data that are instructed by the controller 101 to be outputted.

The communication unit 116 has functions of sending the information instructed by the controller 101 by wireless communication or receiving the information sent by wireless communication from a server. Furthermore, when the musical tune used for music reproduction function implemented by the music controller 105 is downloaded from the server, this is also is carried out via the communication unit 116 and antenna 117.

If the music controller 105 receives from the controller 101 an instruction to reproduce the musical tune information stored in the tune information storage 115a of the storage 115, it reads out the musical tune information stored in the tune information storage 115a and conducts reproduction control. Furthermore, when reproduction is carried out with the speaker 109 of the cellular phone 1 and an earphone (not shown in the figures) directly connected to the cellular phone 1, it is decoded with the music controller 105 and controlled so as to be outputted with the speaker 109. Furthermore, when music is reproduced in a BT-AV device different from the cellular phone 1 via the BT communication unit 118, the music controller 105 reads out the musical tune information stored in the tune information storage 105a, conducts control converting it into a separate file system corresponding to a decoder of the external BT-AV device, and conducts control to communicate with the external BT-AV device via the BT communication unit 118.

The BT communication unit 118 controls the conversion of the sent data into data corresponding to the BT connection system and the operations of transmitting and receiving data via the BT antenna 119 with the BT connection system. Furthermore, the operations of searching the peripheral BT-communicable communication devices and establishing links prior to data transmission and reception are also controlled in a well-known manner by the BT communication unit 118.

The camera controller 112 is activated by the controller 101, and images inputted from the camera 12 are displayed, e.g., on display 5 via the display controller 113.

The operation unit 106 has a key input unit 106a for recognizing that the keys 6 and side keys 7 have been pushed and a music operation input unit 106b for recognizing that the electrostatic touch pad 14 has been pushed. The key input unit 106a can recognize that a plurality of keys including digit keys, letter keys, and functional keys, e.g., for determining and interrupting mail editing have been pushed. It conveys the recognition signal that recognizes a key to the controller 101 correspondingly to the input of key 6 input operated by the user, and the controller 101 stars the respective operation. Furthermore, the music operation input unit 106b can also recognize the operation when music reproduction, stop, pause, fast forward, rewinding, tune selection, sound volume adjustment, and Music Player start-stop are carried out via the electrostatic pad 14.

Figure 3A:
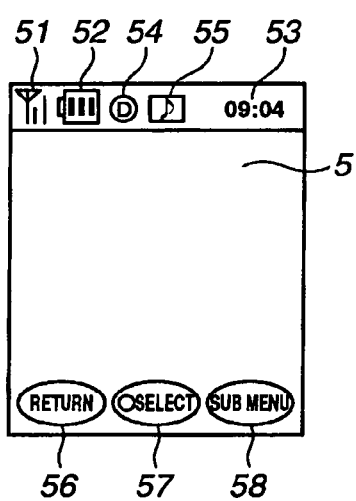
FIGS. 3A through 3C show an example of display on the display 5, an example of arrangement of keys 6, and an example of arrangement of operation zones of the electrostatic touch pad 14 in the embodiment.
Figure 3B:
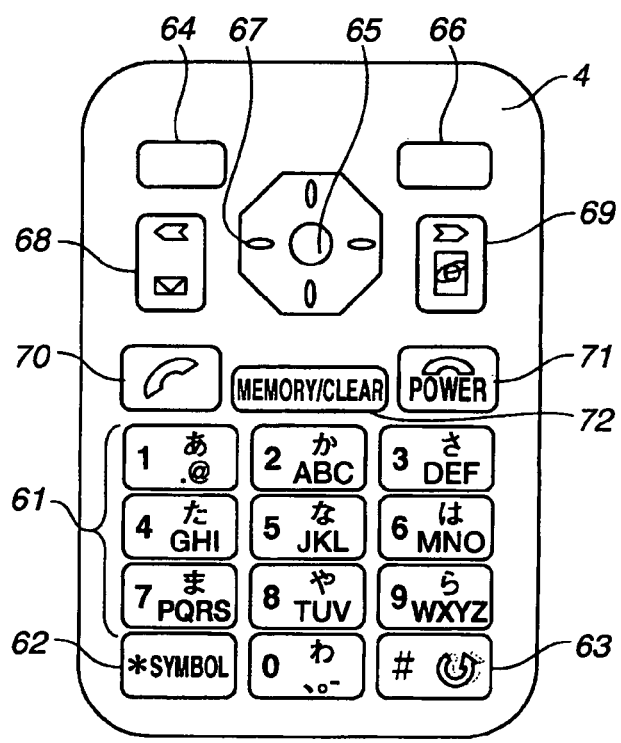
Figure 3C:
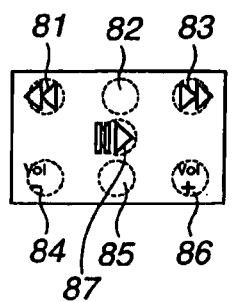

FIG. 3 shows an example of display on the display 5 of the cellular phone 1, an arrangement example of keys 6, and an arrangement example of operation zones of the electrostatic touch pad 14 in which FIG. 3A shows an example of display on the display 5, FIG. 3B shows an arrangement example of keys 6, and FIG. 3C shows an arrangement example of operation zones of the electrostatic touch pad 14. As shown in FIG. 3A, in the uppermost row (referred to hereinbelow as "upper pictogram row") of the display 5 of the cellular phone 1, there are displayed an antenna pictogram 51 showing the present level of sensitivity of the antenna 117, a battery pictogram 52 showing the present remaining battery charge of the cellular phone 1, a time display 53 displaying current time, a BT icon 54 displayed when BT is activated, and a music icon 55 displayed when, for example, a Music Player (denoted hereinbelow by "MP") is activated. In the BT icon 54, the icon background is displayed with blue color (the ellipse in the figure is blue) during BT connection and with white color (the ellipse in the figure is white) during server operation (BT connection standby state). Further, when BT connection is not performed (including the case where the BT link is cut off), control is so conducted that the icon is not displayed. As mentioned above, the music icon 55 is displayed when MP is activated, but it can be also displayed during background reproduction (referred to hereinbelow as BGM). In other cases, control with the controller 101 is so conducted that the icon is not displayed.

In the lowermost row (referred to hereinbelow as "lower pictogram row") of the display 5 of the cellular phone 1, of the presently displayed functions, simple explanation is provided to functions executed when a soft key left 64, confirmation key 65 (central portion of a cross-like key 67), and soft key right 66 are pushed. Thus, for the soft key left 64, the explanation is displayed at the lower left pictogram 54, for the confirmation key 65, the explanation is provided at the central lower pictogram 55, and for the soft key right 66, the explanation is provided at the lower right pictogram 56. For example, in the case of the display shown in FIG. 3A, if the soft key left 64 is pushed, the "RETURN" function is executed, and if the confirmation key 65 is pushed, the function that is presently in focus (not shown in the figure) can be selected. Furthermore, if the soft key right 66 is pushed, "submenu" is displayed.

As shown in FIG. 3B, the lower key section 4 has the following keys 6: digit keys 61, a "*" key 62, a "#" key 63, a soft key left 64, a confirmation key 65, a soft key right 66, a cross-like key 67, a mail key 68, a browser key 69, a telephone key 70, a power source key 71, and a clear key 72. In addition to digits, Japanese alphabet KANA symbols, various signs, and English alphabet letters are allocated to the digit keys 61. For example, digit "1", Japanese KANA symbols "あ", "い", "う", "え", "お" (respectively represented by "a", "i", "u", "e" and "o" in English alphabet letters), and signs ".", "@" are allocated to the key "1". Digit key "2", Japanese KANA symbols "か", "き", "く", "け", "こ" (respectively represented by "ka", "ki", "ku", "ke" and "ko" in English alphabet letters), and alphabet letters "A", "B", "C", "a", "b", and "c" are allocated to key "2". Furthermore, "*" is allocated to the "*" key 62, and, in a letter input state, a symbol list and pictogram list can by called out by the key 62. Furthermore, "#" is allocated to the "#" key 63, and in a letter input state, the toggle of letter input with the digit key 61 can be reversed by the key 63.

The cross-like key 67 has an upper key, a lower key, a left key, a right key, and the confirmation key 65 and can move the cursor in the up-down and left-right direction. In addition, if the confirmation key 65 is pushed, various functions can be confirmed. Furthermore, the mail key 68 can call out a mail send/receive function. The browse key allows for connection to Web or the like.

The telephone key 70 is mainly used when a call is received or when a usual signal is generated. The power source key 71 is mainly used for power source ON and OFF, and also when the call is completed or when a function or editing is completed. The clear key 72 is mainly used when a function or editing is cleared and to erase a letter in case of letter input. Furthermore, if the clear key 72 is pushed in a standby screen, a memo register can be called out.

Furthermore, as shown in FIG. 3C, the electrostatic touch pad 14 appears to be a single touch pad, but sensors 81 to 87 are provided in seven places shown by dot line circles in FIG. 3C, and if the sensor 81 detects that the user has touched the pad close to the location of sensor 81, a rewind function is executed. Similarly, if the sensor 83 detects that a sensitive zone was touched, a fast forward function is executed, if the sensor 84 detects that a sensitive zone was touched, a one-level sound volume down operation is executed, if the sensor 86 detects that a sensitive zone was touched, a one-level sound volume up operation is executed, and if the sensor 87 detects that a sensitive zone was touched, a reproduction operation is executed in a state where the music was stopped and a pause operation is executed in a state where the music was reproduced. Furthermore, if the sensors 81, 82, 83 are detected to be touched in the order of description within a prescribed interval (the user performs a tracing operation from the left to the right), then search of several tunes forward is executed. Conversely, if the sensors 83, 82, 81 are detected to be touched in the order of description within a prescribed interval (the user performs a tracing operation from the right to the left), then search of several tunes backward is executed. Furthermore, if the sensors 84, 85, 86 are detected to be touched in the order of description within a prescribed interval (the user performs a tracing operation from the left to the right), then the sound volume up operation is executed through several levels. Conversely, if the sensors 86, 85, 84 are detected to be touched in the order of description within a prescribed interval (the user performs a tracing operation from the right to the left), then the sound volume down operation is executed through several levels.

Furthermore, as described hereinabove, sensors 11a to 11d for detecting the state of the upper case section 2 and lower case section 4 are provided in the upper case section 2 and lower case section 4. Those sensors 11a to 11d comprise, for example, magnetic sensors, and the sensors output detection signals in proximal state within a fixed range. Of the sensors 11a to 11d, a pair of sensors 11a and 11b detect whether or not the upper case section 2 and lower case section 4 lie one on top of another.

Figure 5:
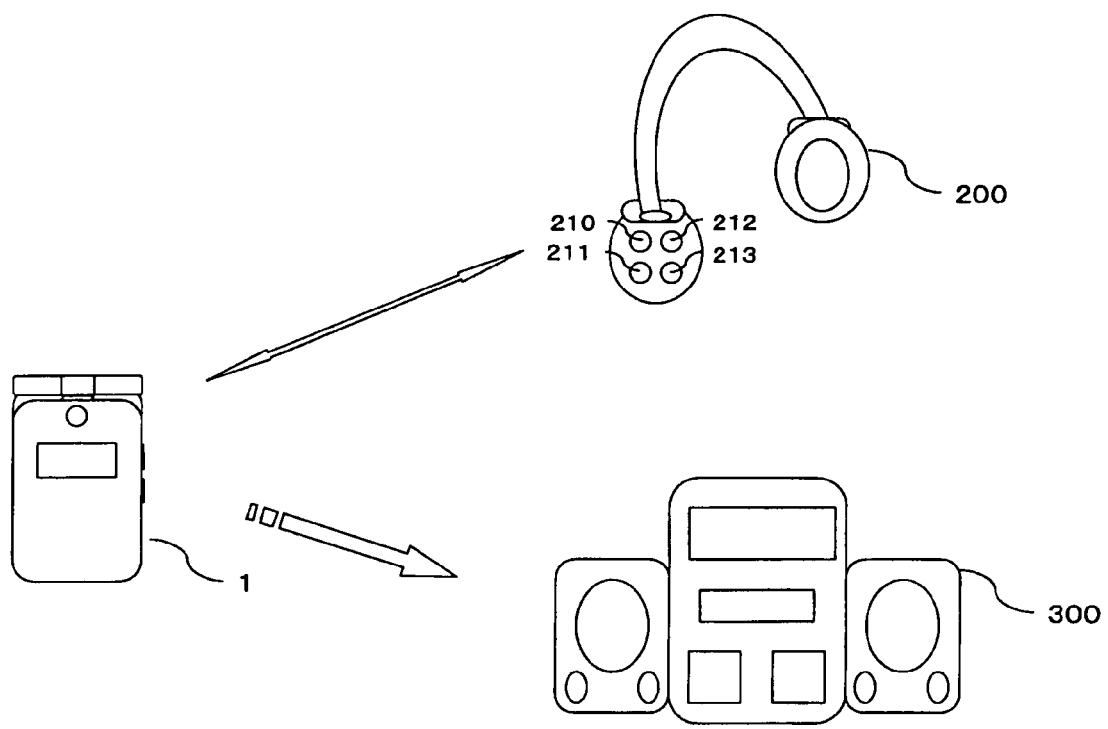
FIG. 5 illustrates the connection relationship of the cellular phone 1 and BT headphone 200 or BT component and the external appearance of the BT headphone 200 in the embodiment.

FIG. 5 illustrates an embodiment of a system using a cellular phone 1 carrying the BT, a BT headphone 200 carrying the BT, and a BT component 300 carrying the BT. The cellular phone 1 also can issue a processing request (cry-out operation) which is necessary for establishing connection of BT communication and can conduct processing necessary for establishing the communication and respond (server operation) to the connection request from other communication devices.

Furthermore, the cellular phone 1 can be connected to other communication devices carrying the BT, but there are BT communication devices (for example, the BT headphone 200) capable of conducting both the cry-out operation and the server operation and BT communication devices (for example, the BT component 300) capable only of conducting the server operation and incapable of conducting the cry-out operation. In other words, the cellular phone 1 and BT headphone 200 can by themselves conduct the connection operation to other BT devices and, obviously, also can receive such a connection. However, the BT component 300 cannot by itself connect to other BT devices and can only receive the BT connection.

The BT headphone 200 shown in FIG. 5 has a power source key 210 capable of switching the power source ON/OFF, a reproduction key 211 for reproducing musical information received by BT communication, a stop key 212 for stopping music during reproduction, and a pause key 213 for pausing/restarting the music during reproduction.

Figure 6:
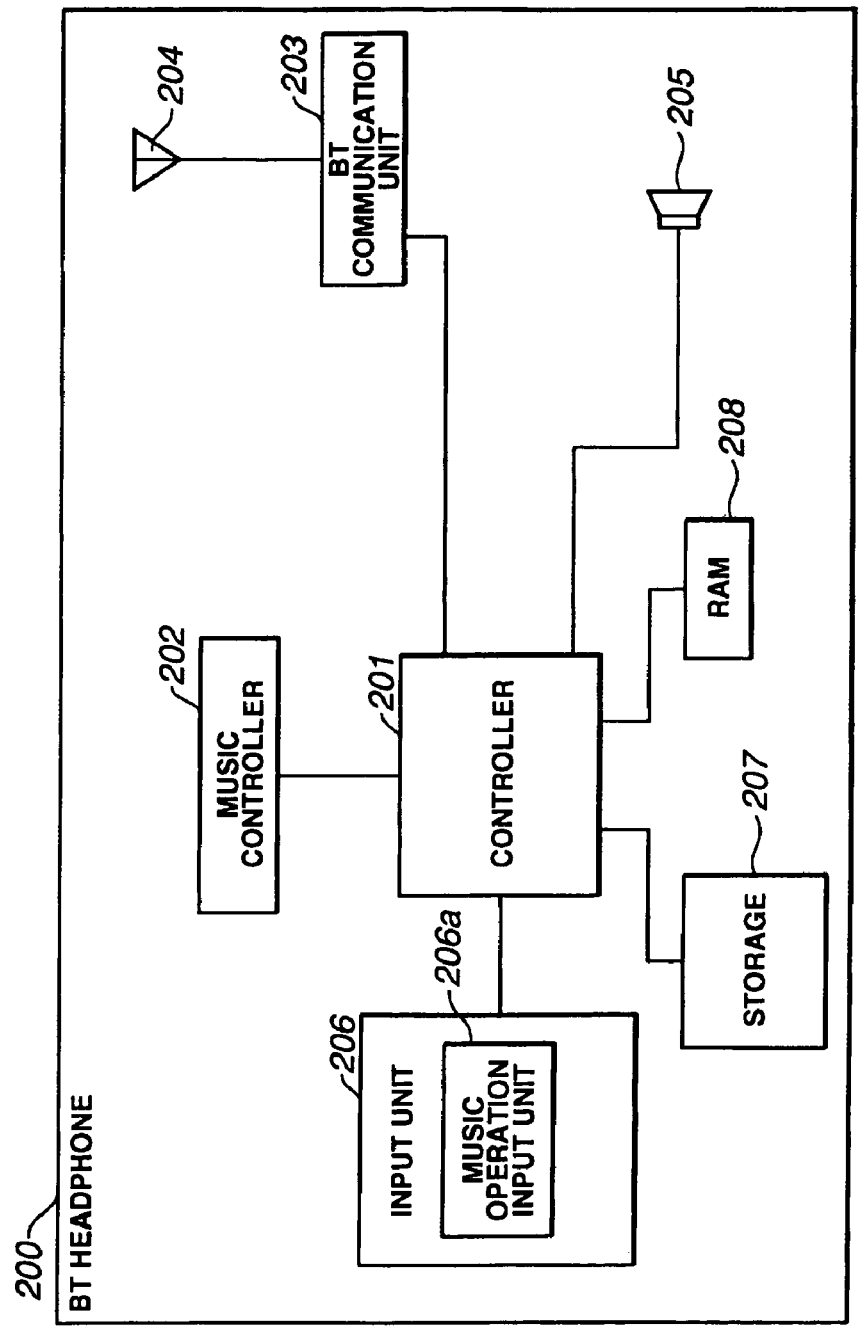
FIG. 6 is a block diagram illustrating in a simple manner the configuration of the BT headphone 200 of the embodiment.

FIG. 6 is a block-diagram illustrating schematically the configuration of the BT headphone 200. Inside the BT headphone 200 there are provided a controller 201 for controlling the entire BT headphone 200, a music controller 202, a BT communication unit 203, a BT antenna 204, a speaker 205, an input unit 206, a nonvolatile storage 207 comprising ROM or the like, and a volatile RAM 208 for temporary storage; all the units are controlled by the controller 201.

The storage 207 stores a program executed by the controller 201 and various information data.

The input unit 206 has a function of detecting the input of the power source key 210, etc., and sending this signal to the controller 201. Furthermore, the input unit 206 also comprises a music operation input unit 206a for receiving the input of music reproduction operation of the reproduction key 211, stop key 212, and pause key 213.

The BT communication unit 203 controls the transmission and reception of data via the BT antenna 204 with the BT connection system. Furthermore, the operations of searching the peripheral BT-communicable communication devices and establishing links prior to data transmission and reception are also controlled in a well-known manner by the BT communication unit 203.

The music controller 202 has a function of decoding and reproducing music files that were transmitted from other BT devices when connection with other BT devices is established and music reproduction is conducted with the BT headphone 200.

The present embodiment assumes that it is necessary to start the BT before activating the MP and to obtain a list that has to be connected by BT connection with the cellular phone 1. If the confirmation key 65 of the cellular phone 1 is pushed, a menu screen (not shown in the figures) is displayed. In this state, if a BT menu is selected from the menu and a search operation is selected from the selected menu, the search is conducted. At this point in time, a BT table (not shown in the figures) that stores the device name information, address information, device type information, and corresponding service information of a plurality of BT-communicable communication devices present in the peripherals is loaded from those devices.

Then, the corresponding service of the loaded BT table is checked, which service can be executed is examined, and a communicable remote device is verified. If a communicable remote device is present, then one list of remote devices (a list based on the BT table of respective peripheral devices). is displayed on the display unit of a wireless communication unit. This list information is then stored in the BT connection list storage 115b.

As descried above, it may be necessary to obtain a list that has to be connected by BT connection with the cellular phone 1. Together with this operation, exchange of PIN codes for mutual authentication of the cellular phone 1 and BT-AV device (for example BT headphone 200) is conducted at this point in time. Furthermore, a setting can be made such that the exchange of PIN codes is not conducted at a stage of obtaining the list, and the PIN codes may be exchanged at a stage of establishing communication in the below-described flow shown in FIG. 7 to FIG. 12.

Figure 7:
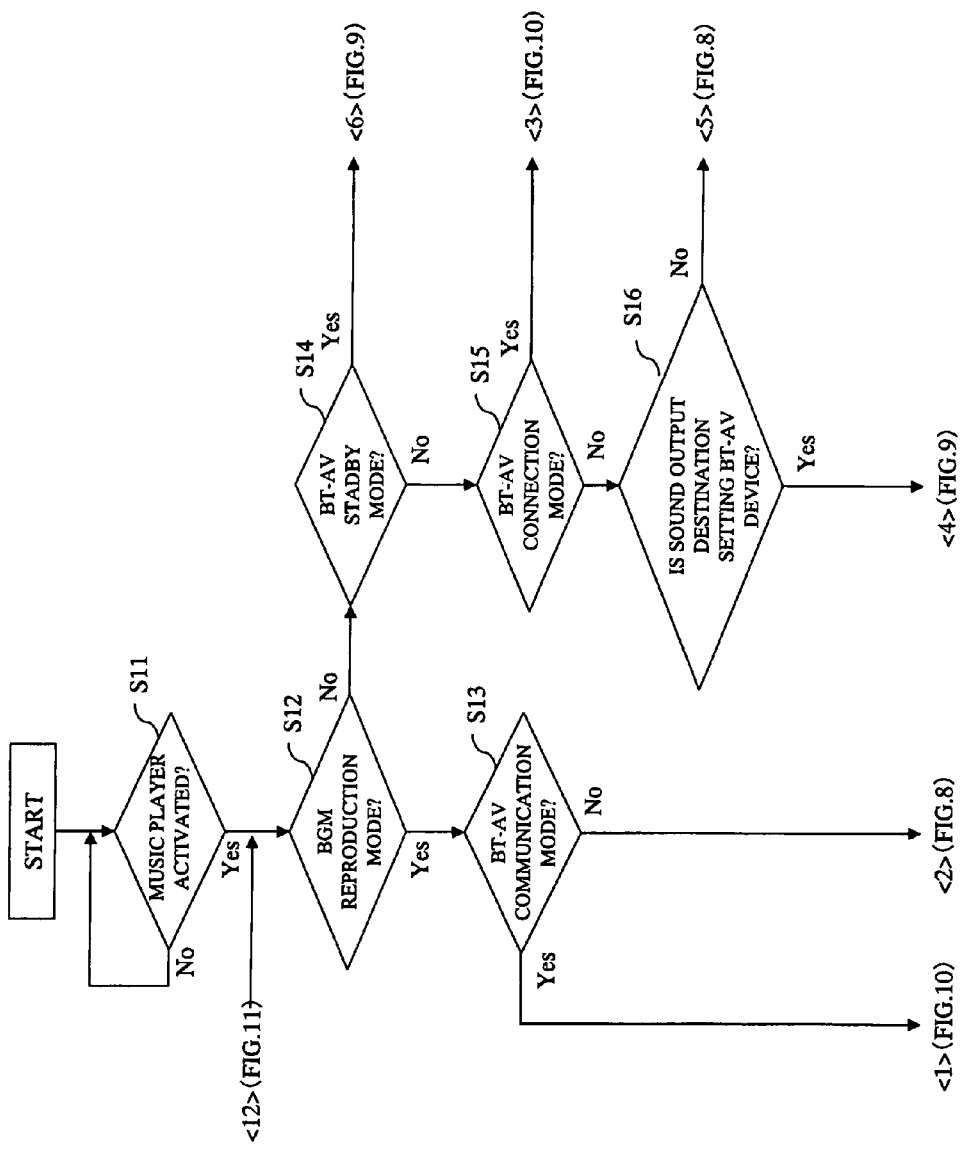
FIG. 7 is a flowchart illustrating the MP start operation of the embodiment.
Figure 8:
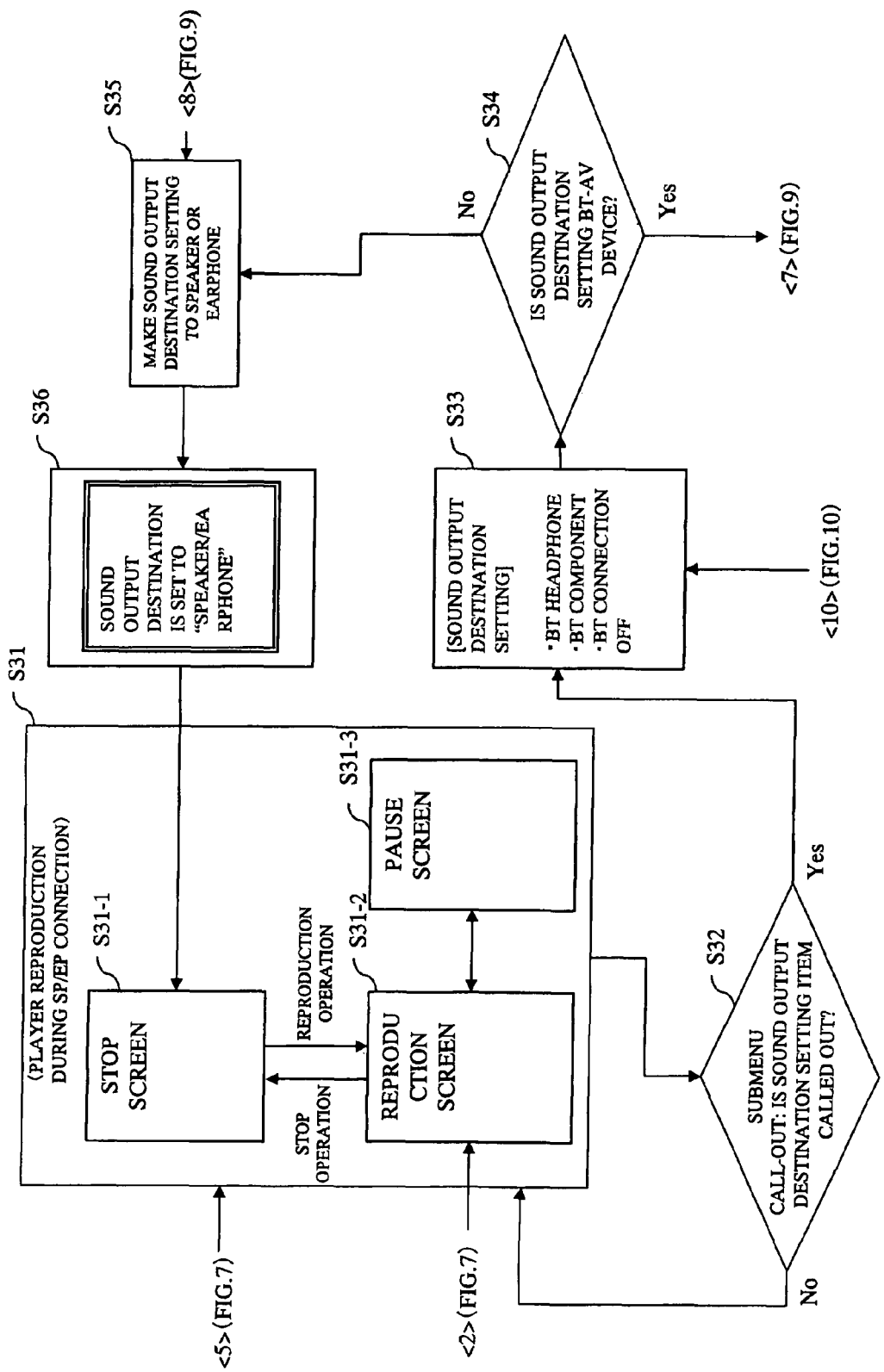
FIG. 8 is a flowchart illustrating the BT-AV connection start operation in the embodiment.
Figure 9:
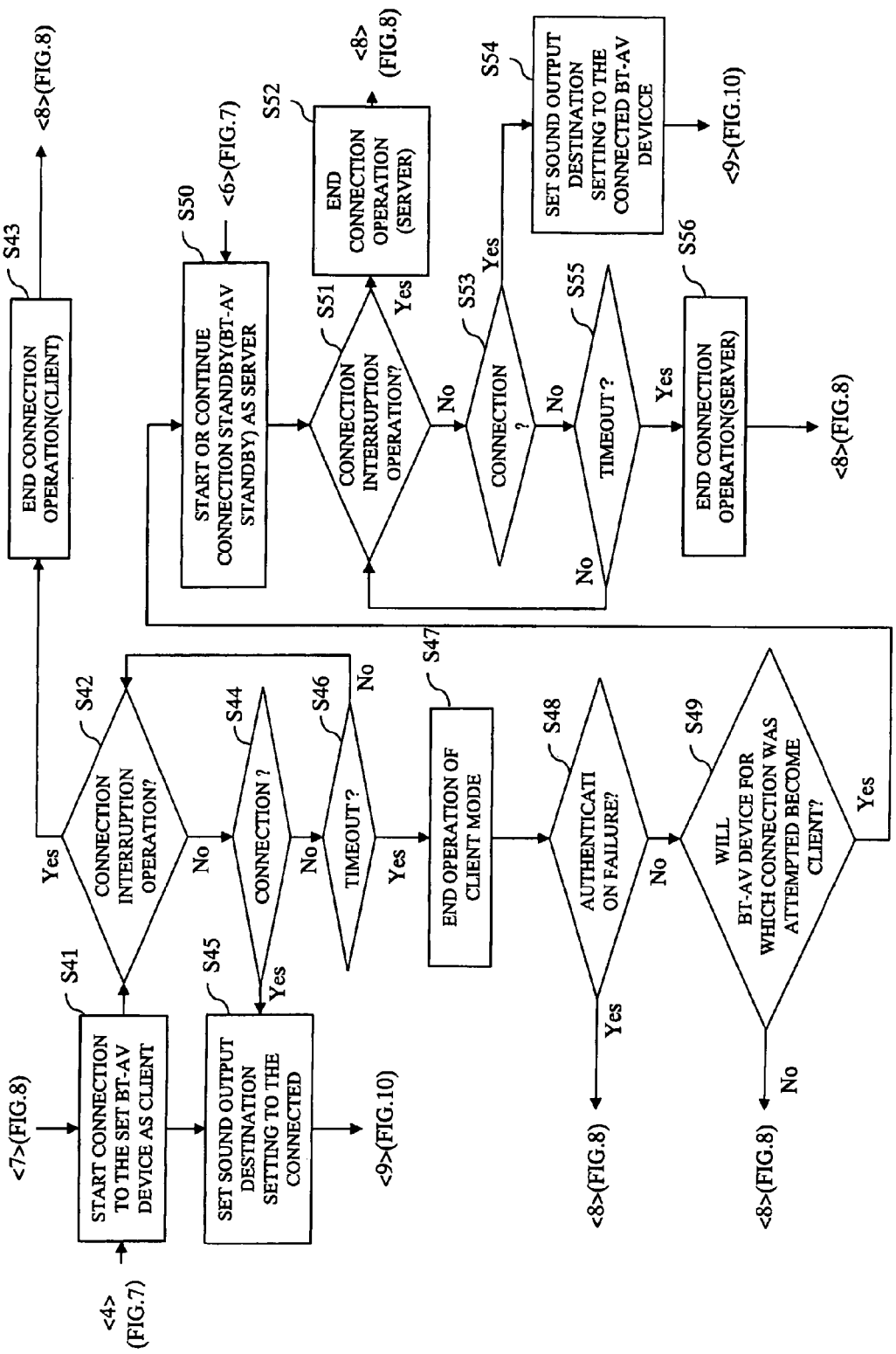
FIG. 9 is a flowchart illustrating the MP operation and speaker/earphone output operation in the embodiment.
Figure 10:
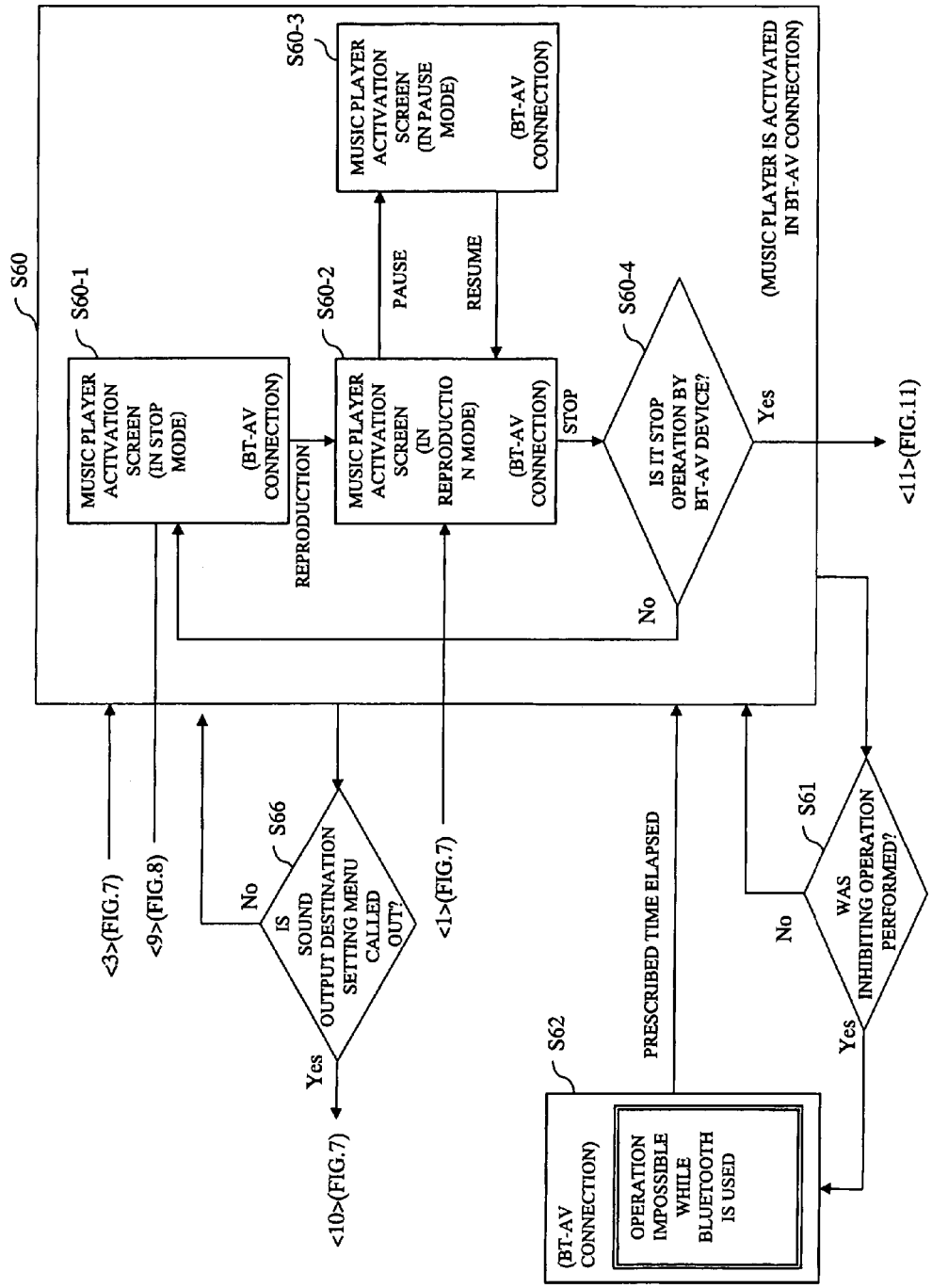
FIG. 10 is a flowchart illustrating the MP operation and BT-AV connection device output in the embodiment.
Figure 11:
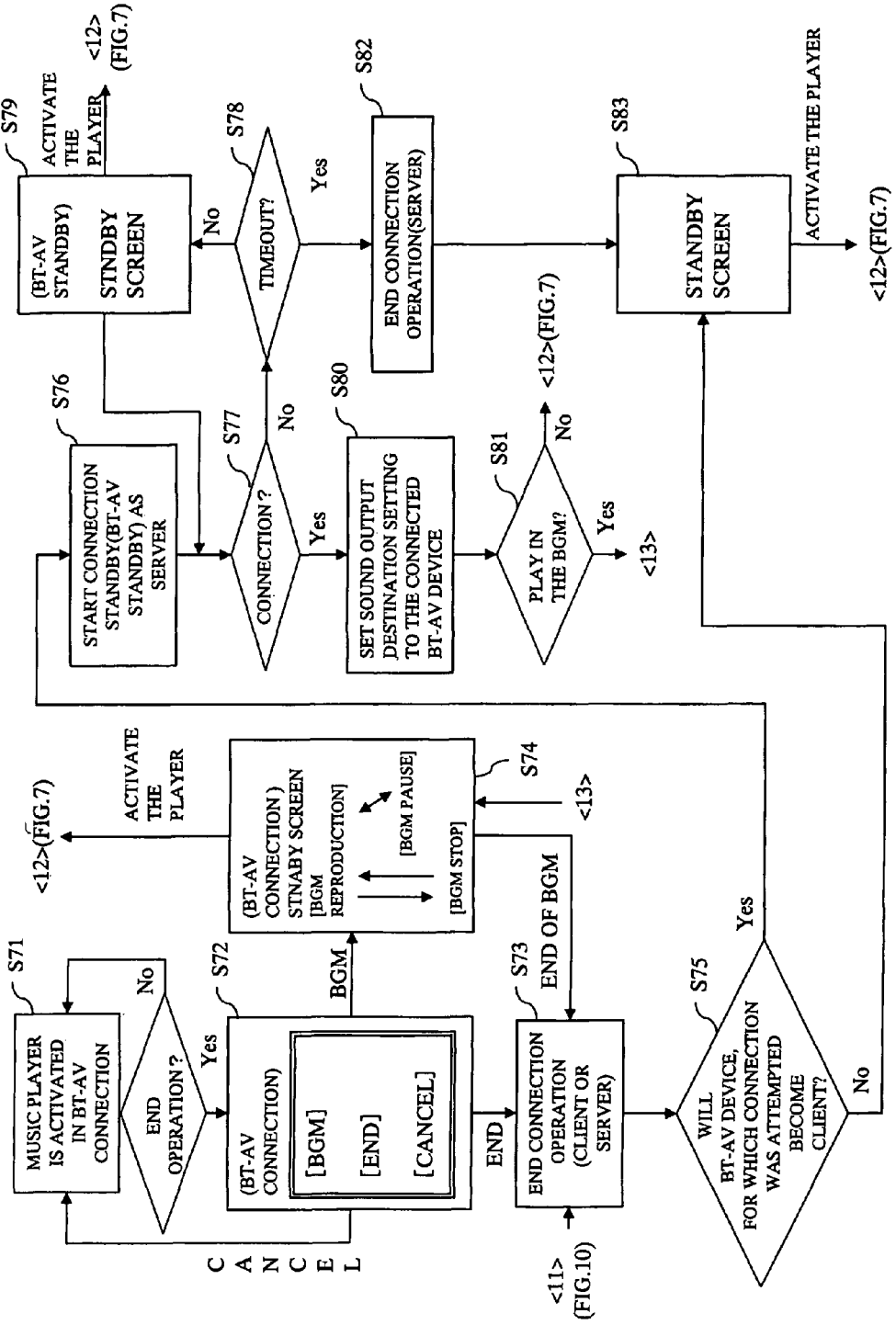
FIG. 11 is a flowchart illustrating the BT-AV connection end operation and the BT-AV standby operation in the embodiment.
Figure 12D:
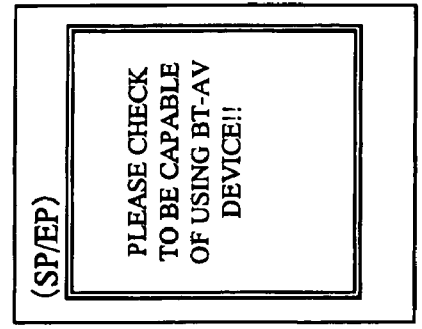
FIGS. 12A through 12H are diagrams which the display screen displayed on the display 5 of the cellular phone 1 in the embodiment, when starting MP.
Figure 12C:
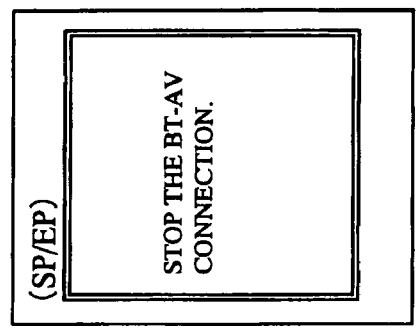
Figure 12B:
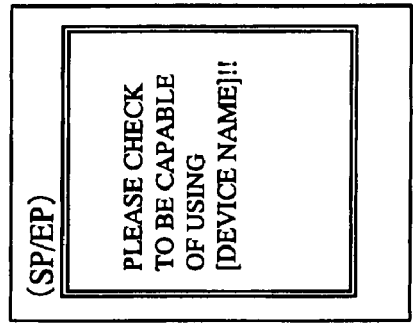
Figure 12A:
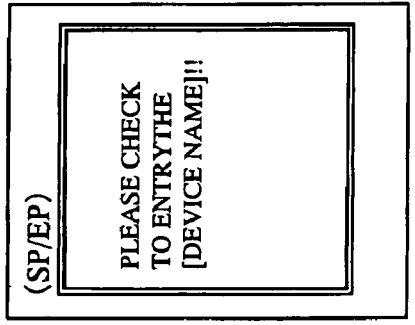
Figure 12H:
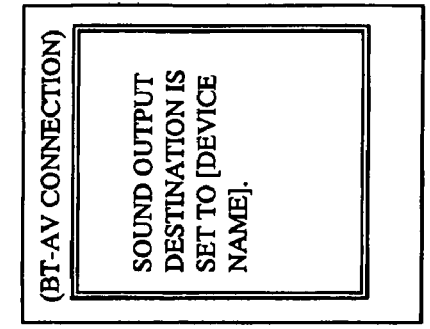
Figure 12G:
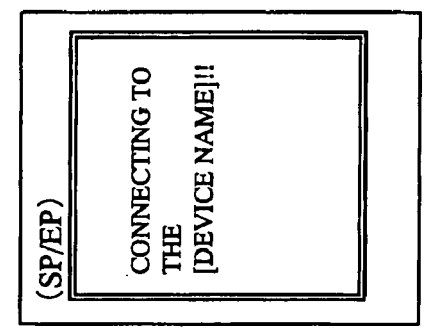
Figure 12F:
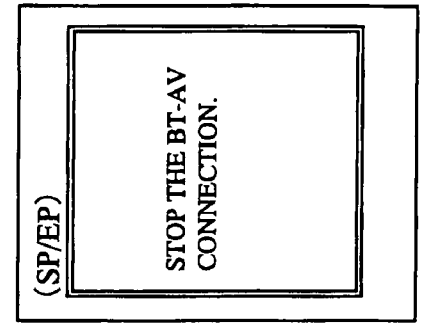
Figure 12E:
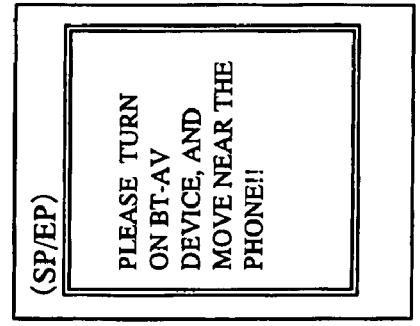

The flow of operations executed when music reproduction is conducted with the cellular phone 1 of the embodiment of the present invention will be explained below with reference to FIGS. 7 to 13. The operation of the cellular phone 1 of the present invention can be divided as follows.
(1) MP start operation (FIG. 7).
(2) BT-AV connection (connection between the cellular phone 1 and the communication device carrying the BT; same hereinbelow) start operation (FIG. 9).
(3) MP operation—speaker/earphone output (abbreviated hereinbelow as SP/EP output) (FIG. 8).
(4) MP operation—BT-AV connection device output (FIG. 10).
(5) BT-AV connection end operation and BT-AV connection standby operation (FIG. 11).

Each of the aforementioned operations will be described hereinbelow separately. The explanation will be conduced with appropriate reference to FIG. 12. FIG. 12 illustrates an example of a display screen of the display 5 when the cellular phone 1 operates.
(1) MP Start Operation The MP start operation will be explained below. FIG. 7 is a flowchart illustrating the operations conduced during MP activation. Whether the Music Player (MP) has been activated from the usual standby state of the cellular phone 1 (step S11) is initially determined. Further, examples of MP activation methods include calling out from the menu by pushing the confirmation key 65 (MP activation that is not accompanied by reproduction), calling out by pushing the side key 7 within the prescribed interval (MP activation that is accompanied by reproduction), and calling out by pushing the electrostatic touch pad 14 within the prescribed interval (MP activation that is accompanied by reproduction). The activation that is accompanied by reproduction is, for example, an activation in which reproduction is carried out simultaneously with the activation; the activation that is not accompanied by reproduction indicates the case where reproduction is not carried out simultaneously with the activation (including a pause in the course of the procedure in which the previous tune reproduction was conducted).

Further, if the MP is activated ("Yes" in step S11), then it is determined whether the music is being reproduced in the BGM (step S12). When the music is determined to be reproduced in the BGM ("Yes"), it is determined as to whether the BT-AV connection is being made by the BT (step S13). Furthermore, when the BGM reproduction was not determined in step S12 ("No"), it is determined whether the system is in a BT-AV standby mode (step S14).

Then, when the system was determined in step S113 to be in a BT-AV connection mode ("Yes"), the BGM reproduction of tune information is simply shifted to the MP, that is, to the foreground reproduction (referred to hereinbelow as FGM) and the music continuous to flow from the BT-AV device that has been outputting the music, without change, even in the middle of the tune ("Yes" direction of step S13; <1> transition to step S60-2 in FIG. 10).

On the other hand, when the system was determined in step S113 not to be in the BT-AV connection mode ("No"), the tone information is reproduced by player operation with SP/EP output settings. In this case, too, the BGM reproduction in the SP/EP output simply shifts to the FGM reproduction, and music output is carried out uninterrupted from a speaker or earphone that has been outputting the music, without change, even in the middle of the tune ("No" direction of step S13; <2> advancement to step S31-2 in FIG. 8).

When the system was determined to be in a BT-AV standby mode ("Yes" in step S14) as a result of determining in step S14 as to whether or not it is in a BT-AV standby mode, the BT-AV standby is continued, that is, connection wait as a server is continued (<6>, step S50 in FIG. 9).

On the other hand, when the system was determined not to be in a BT-AV standby mode ("No" in step S14) as a result of determining in step S14 as to whether or not it is in a BT-AV standby mode, whether or not it is in a BT-AV connection mode is determined (step S15).

Further, when the system was determined to be in a BT-AV connection mode ("Yes" in step S15), the player operations are carried out with respect to the output destination which is in the BT-AV connection (<3>, step S60 in FIG. 10). When the player operations are carried out, for example, in the case of MP activation that is accompanied by reproduction during MP activation in step S11, the player operation (reproduction) is carried out (step S60-2), and in the case of MP activation that is not accompanied by reproduction, the player operation (pause) is carried out (step S60-3). This transition is merely an example and the appropriate setting may provide for transition to any state (reproduction, stop, pause) in the frame of step S60 shown in FIG. 10.

On the other hand, if the system was determined in step S15 not to be in the BT-AV connection mode ("No" in step S15), the sound output destination setting stored in the sound output setting information storage 15c is read and whether the setting has been made to a BT-AV device is determined (step S116).

If the sound output destination setting stored in the sound output setting information storage 15c was determined in step S16 not to be that of a BT-AV connectable device ("No"), the player operations are carried out by the connection via SP/EP (<5>, advancement to S31 in FIG. 8). When player operations are carried out, for example, in the case of MP activation that is accompanied by reproduction during MP activation in step S11, the player operation (reproduction) is carried out (step S31-2), and in the case of MP activation that is not accompanied by reproduction, the player operation (pause) is carried out (step S31-3). This transition is merely an example and the appropriate setting may provide for transition to any state (reproduction, stop, pause) in the frame of step S31 shown in FIG. 8.

On the other hand, if the sound output destination setting stored in the sound output setting information storage 15c was determined in step S16 to be that of a BT-AV device ("Yes" in step S116), the BT-AV connection is initiated as a client to the BT-AV device that was set (<4>, advancement to step S41 in FIG. 9). In this case, because the sound output destination setting during previous activation of the player is stored in the sound output setting information storage 115c, this setting is employed as is. Therefore, the user is saved the trouble of making settings each time the player is activated.

Further, the MP start operation is not limited to the activation according to the procedure described in the flowchart shown in FIG. 7. In other words, for example, the design may be such as to make a transition to <1> (FIG. 10) when the system is in the BGM reproduction mode and BT-AV connection mode when the MP was activated in step S11. Similarly, the design may be such as to make a transition to <4> (FIG. 9) in the case where the system is not in the BGM reproduction mode, not in the BT-AV standby mode, and not in the BT-AV connection mode when the MP was activated in step S11 and where the setting of the sound output setting information storage 115c has been set to a BT-AV communicable device.

If the MP, when started in step S11, is not playing back music in the BGM, is not in BT-AV connection standby state, and is not in BT-AV connection, the process moves to (<4> (FIG. 9) or (<5> FIG. 8) according to the setting by the s sound output setting information storage 115c. Here music may be played back either in foreground (FGM) or BGM. With the BGM, for example, music can be played back while another operation (e.g., writing e-mail) is continued in the FGM, thus improving the convenience of the user.

On the other hand, if the MP, when started in step S11, is not playing back music in the BGM, is not in BT-AV connection standby state, is not in BT-AV connection, and is going to play back music in the BGM, the device to receive music may always be set to SP/EP irrespective of the determination in step S116. Alternatively, when the device to receive music is set to a BT-AV device ("Yes" in step S16), BGM playback may be disabled. This prevents BT-AV connection from being started in the background while another operation (e.g., writing e-mail) is performed, thus allowing users to easily grasp the state of operation.

(2) BT-AV Connection Start Operation

The BT-AV connection start operation will be explained below by using FIG. 9. FIG. 9 is a flow chart relating to initiation of the BT-AV connection start operation. The BT-AV connection start operation is carried out: (A) in the case where the system is not in the BGM reproduction mode, not in the BT-AV standby mode, and not in the BT-AV connection mode when the MP was activated in step S11 (step S11) and also the setting of the setting of the sound output setting information storage 115c has been set to a BT-AV connectable device (transition from <4> in FIG. 7), and (B) in the case where the sound output destination setting was changed during MP activation by the SP/EP connection and this change was made to a BT-AV connectable device (transition from <7> in FIG. 8).

First, if the BT-AV connection start operation is carried out in the above-described manner, the BT-AV connection operation (for example, connection by the AV profile) is started as a client with respect the BT-AV device that was set as the sound output destination (the explanation hereinbelow will be conduced with respect to setting to the BT headphone 200) (step S41). Then, it is determined whether or not the connection abort operation has been performed with the clear key 72 or power source key 71 (step S42). If the connection abort operation has been performed ("Yes"), the connection with the BT headphone 200 is ended (step S43). The sound output setting is then set to the SP/EP connection (transition to <8> in FIG. 8).

On the other hand, if the connection abort operation was not detected, whether or not the BT-AV connection was made by the client operation is determined (step S44).

If the BT-AV connection was made, the settings of the sound output destination information stored in the sound output setting information storage 115c are rewritten into the connected BT-AV device (in this case, the BT headphone 200) (step S45). The player operation (stop) is thereafter carried out by the BT-AV connection (<9>, transition to step S60-1 in FIG. 10). In that case, the controller 101 displays a display as shown in FIG. 12 on the display 5.

On the other hand, if the establishment of the BT-AV connection was not determined ("No" in step S44), whether or not the prescribed interval has elapsed (whether there is a timeout) after the connection a client has been started is determined, and if there was no timeout, the processing routine again returns to step S42 ("No" in step S46). If the timeout interval is too short, the connection ratio is decreased, and if the timeout interval is too long, the connection waiting time it too long, both scenarios being undesirable for the user. Accordingly, it is preferred than the timeout time be several seconds (about 5 sec).

If the connection as a client was not made before the prescribed time (time to timeout) in steps S44 and S46 ("Yes" in step S46), the operation of BT-AV connection for which connection as a client was attempted is ended (step S47). Then, it is determined whether or not the connection failure caused by authentication failure (authentication of the cellular phone 1 and BT-AV device based on PIN codes) at the time the connection was attempted is the reason for the connection failure (step S48). This is because if the connection failure is caused by the authentication failure, it is necessary to receive the PIN codes again and conduct authentication with the BT-AV device.

If the connection failure is not caused by the authentication failure, ("No" in step S48), it is determined whether or not the connected BT-AV device (BT headphone 200) itself is a device operable as a client (step S49). A method for determining as to whether the device is operable as a client will be described below.

If the BT-AV device for which the connection was attempted is determined as a device that will be a client ("No" of step S49), then the BT-AV connection wait as a server is started (step S50). Furthermore, only the BT-AV device for which connection as a client has been heretofore attempted (in this case, the BT headphone 200) may be set as a BT-AV connectable device that waits connection as a server at this time, or the connection wait may be carried out with respect to all the BT-AV devices stored in the BT connection list storage 115b (in this case, not only the BT headphone 200, but also other devices such as BT component 300 are included).

Furthermore, the controller 101 displays a display as shown in FIG. 12 (E) on the display 5. Hereby, the cellar phone 1 may be told about by the display (FIG. 12 (E)), when the power supply of a BT-AV device is turned off. Furthermore, the cellar phone 1 may urge to a user to turn on the power supply of a BT-AV device by the display (FIG. 12 (E)).

Then, if the BT-AV connection wait operation as a server is carried out in step S50, it is thereafter determined whether or not the connection abort operation by the clear key 72 or power source key 71 has been performed (step S51).

If the connection abort operation has been performed ("Yes"), the connection with the BT headphone 200 is ended (step S52). And the controller 101 displays a display as shown in FIG. 12 (F) on the display 5. Furthermore, the sound output setting is set as a SP/EP connection (transition to <8> in FIG. 8).

On the other hand, is the connection abort operation has not been detected, then whether or not the BT-AV connection was made by the server operation is determined (step S53).

If the BT-AV connection was made, the setting of the sound output destination information stored in the sound output setting information storage 115c is rewritten as the connected BT-AV device (step S54). Then, the player operation (stop) is carried out by the BT-AV connection (<9> transition to step S60-1 in FIG. 10). And the controller 101 displays a display as shown in FIG. 12 (H) on the display 5.

On the other hand, if it is not determined that the BT-AV connection was made ("No" of step S53), then whether or not the prescribed interval has passes after the connection as a client was started (is there a timeout) is determined, and if there is no a timeout, the processing routine again returns to step S51 ("No" in step S55). Furthermore, after the guidelines have been displayed for the user in step S50, it may be necessary to wait for a time sufficient for the user to switch on the power source of the connection destination. Therefore, the timeout interval during connection wait as a server is preferably from several tens of seconds to about 1 min.

In the case where no connection as a server was made within the prescribed interval (timeout interval) in steps S53, S55 ("Yes" of step S55), the server mode operation is ended (step S56). And the controller 101 displays a display as shown in FIG. 12 (D) on the display 5. Furthermore, the sound output setting is set as a SP/EP connection (<8> transition to step S35 of FIG. 8).

In the case where the BT-AV connectable device for which the connection was attempted is determined not to be a client ("No" in step S49) if the failure cause was an authentication failure in step S48 ("Yes" in step S48), the controller 101 sets the sound output setting as the SP/EP connection (<8> transition to step S35 of FIG. 8). Furthermore, the controller 101 displays a display as shown in FIG. 12 (A) or FIG. 12 (B) on the display 5.

Furthermore, making a <8> (FIG. 8) transition and setting to the SP/EP connection is not the only option when the connection failure cause was an authentication failure in step S48 ("Yes"). Thus, settings may be such that if the connection failure cause is an authentication failure, a PIN code for PIN code authentication of the BT-AV device for which this connection was attempted is received again and the processing routine then returns again to step S41 and the connection to this BT-AV device as a client is again attempted.

In this BT-AV connection operation, initially the connection as a client was implemented, and a server mode operation was implemented in the case of a failure. However, the same effect can be obtained if those operations are transposed with each other. Furthermore, even if the cellular phone 1 and the BT-AV device capable of operating as a client (for example, the BT headphone 200) implement the client connection operation at the same time, the connection of communication can be established by repeating the operations of the present embodiment.

(Determination Whether or not the Device that can be BT-AV Connected is a Client)

Methods for determining whether or not the BT-AV device that was attempted to be connected in step S49 becomes a client will be described below in greater detail. The following four methods (A) to (D) will be considered and the procedure will be implemented by each method and by combination thereof.

(A) No determination is made, and the device is assumed to become a client.

If a transition is made to step S49, no determination is carried out, the device is assumed to be a client, and a transition is always made to step S50.

(B) When a peripheral device list is registered, information indicating whether or not the device will become a client is set at the same time As described hereinabove, the peripheral device list has to be obtained and stored in the BT connection list storage 115b before the MP is activated, and when this list is obtained (displayed), information relating to each BT-AV connectable device and indicating whether or not the device can be connected as a client is associated with respective device information and stored in the BT connection list storage 115b, and when a transition is made to step S49, this information is read and a decision is made whether the device will become a client.

(C) Determination from information loaded when the peripheral device list is searched The peripheral device list is searched and service information (for example, in the BT standard, it is a service code stored in the location called "SDDB") is included in the information that will be loaded; whether or not the device will be a client is determined based on the Supported Features information of this service information. This Supported Features information describes the information indicating a class of terminals to which this device belongs and is set in the storage 115 of the cellular phone 1 correspondingly to this class by associating the information on this class with the information indicating in advance whether the device will be a client (not shown in the figure). Whether or not the connected BT-AV device will be become a client is determined based on this information. More specifically, storage in the storage 115 is conducted by associating with the respective information so that if a flag indicating a Headset is set in advance in the Supported Features Information, the BT-AV device is determined to become a client and a server, and if other flags are set, the BT-AV device is determined to be necessarily a server. When the determination of step S49 is made, whether or not the device for which the connection was attempted will become a client is determined base on this associated information.

In addition, the information on whether or not the BT-AV device itself will become a client is introduced into a preset area (for example, in the BT standard, the data of "Provider Name" of the service information) of the service information, and whether or not the respective BT-AV devices will become clients can be determined based on the service information described in the BT table of the actual cellular phone 1. When the determination of step S49 is made, whether or not the device will become a client is determined based on the information in this BT table.

(D) If connection is made from a BT-AV device with a client, the information indicating that the device can be a client is recorded and the determination is made based on this information In the case where a BT-AV connectable device (for example, the BT headphone 200) was connected as a client when the BT connection was made with the cellular phone 1 and the BT-AV connectable device stored in the BT connection list storage 115b (the case where the cellular phone 1 was connected as a server), the connected BT-AV device (for example, the BT headphone 200) that was stored in the BT connection list storage 115b and the information indicating that it can be a client are associated and stored. Furthermore, whether or not the information indicating that the device can be a client has been recorded is determined when the possibility of becoming a client is determined in step S49.

(3) MP Operation and SP/EP Output

The MP operation and SP/EP output operation (abbreviated hereinbelow as SP/EP output operation) will be explained below with reference to FIG. 8. FIG. 8 is a flowchart relating to reproduction of a tune stored in the tune information storage 115a by the SP/EP output.

First, the SP/EP output operation is carried out A when the MP is activated and the system is not in the BGM reproduction mode or BT-AV connection mode (<2> FIG. 7) and B in the case where the MP is activated, the system in not in the BGM reproduction mode, not in the BT-AV connection standby mode, and not in the BT-AV connection mode and also the sound output destination setting is not the BT-AV device (<5> FIG. 7) in the MP start operation.

If the above-described operations are performed in the SP/EP output operations, the reproduction (step S31-2)-stop (step S31-1)-pause (step S31-3) of the tune from the speaker 109 are conducted. Those operations are together referred to as SP/EP player reproduction (step S31). Furthermore, the transition between the tune reproduction (step S31-2)-stop (step S31-1)-pause (step S31-3) operations can be made by operating the keys 6 and electrostatic touch pad 14. In the course of SP/EP player reproduction, the controller 101 calls out the submenu activated when the right soft key 66 is pushed and determines as to whether or not the sound output destination setting item screen has been called out (step S32). In the case where the controller determined that the sound output destination setting item screen has not been called out, the SP/EP player reproduction is continued ("No" in step S32).

On the other hand, when the controller 101 determines that the sound output destination setting item screen has been called out, it displays on the display 5 the display described in step S33 of FIG. 8 (step S33).

Furthermore, as items that are displayed on the display 5, all the BT-AV devices and "BT connection OFF" of the peripheral device list stored in the BT connection list storage device 115b are displayed. When the sound output destination is the present BT-AV device, a display may be made where only the "BT connection OFF" can be selected, and when the present sound output destination is SP/EP, the display may indicate that only the "BT connection OFF" cannot be selected. Furthermore, it is also possible to display that only the present sound output destination cannot be selected.

If any of the sound output destination settings was selected n step S33, the controller 101 determines whether or not this selected sound output destination setting is a BT-AV device (step S34). If the selected sound output destination setting is a BT-AV device ("Yes" of step S34), the BT-AV connection is started for this device (<7> FIG. 9).

On the other hand, when it was determined that the selected sound output destination setting was not a BT-AV device ("No" in step S34), the sound output destination setting is set to a speaker or earphone (SP/EP).

This is stored in the sound output setting information storage 115c. The controller 101 then displays the display indicated in step S36 on the display 5. A transition is thereafter made to a tune reproduction operation (stop) with the SP/EP output (step S31-1).

(4) MP Operation—BT-AV Connection Device Output

The MP operation—BT-AV connection device output (denoted hereinbelow as BT-AV output) will be explained below. FIG. 10 is a flowchart relating to the MP operation—BT-AV output.

First, the BT-AV output operation is carried out (A) when the MP is activated and the system is in the BGM reproduction mode and BT-AV connection mode (<1> FIG. 7) and (B) in the case where the MP is activated, the system in not in the BGM reproduction mode, not in the BT-AV connection standby mode and in the BT-AV connection mode (<3> FIG. 7), and (C) the BT-AV output was successfully connected (<9> FIG. 9 step S45-step 54) in the MP start operation.

If the above-described operations are performed in the BT-AV output operations, the reproduction (step S60-2)-stop (step S60-1)-pause (step S60-3) of the tune from the BT-AV device (for example, the speaker 205 of the BT headphone 200) are conducted. Those operations are together referred to as BT-AV player reproduction (step S60). Furthermore, the transition between the tune reproduction-stop-pause operations is described below.

First, if the reproduction operation (for example, the zone of the sensor 87 of the electrostatic touch pad 14 is pushed) is performed in a stop mode, a transition is made to the reproduction. Furthermore, if the pause operation (for example, the pause key 213 of the BT headphone 200 is pushed) is performed during reproduction, a transition made to a pause, and the reproduction is restarted (for example, the zone of the sensor 87 of the electrostatic touch pad 14 is pushed) is performed, a transition is made to the reproduction operation.

If a stop operation is performed during reproduction, then whether or not this stop operation is from a BT-AV device is determined (step S60-4). If it is not a stop operation from a BT-AV device and is a stop operation from the cellular phone 1 ("No" in step S60-4), a transition is made to the stop operation (step S60-1).

On the other hand, if a stop operation (for example, a stop key 212 of the BT head phone 200 is pushed) from a BT-AV device is performed during reproduction, the BT-AV connection is cut off, the client operation or server operation is ended, and a transition is made to a BT-AV end operation (<11> transition to step S73 of FIG. 11).

Then, it is determined (step S61) as to whether or not the inhibiting operation (for example, the operation such that even if, e.g., the sound volume adjustment operation and fast forward and rewind operations are preformed with the keys 6 and electrostatic touch pad 14 of the cellular phone 1 they are not reflected in the control of the BT headphone is considered an inhibiting operation) was performed during the BT-AV connection in the course of BT-AV player reproduction (step S60), and if the inhibiting operation has not been performed, the routine returns to the BY-AV player reproduction ("No"), and when the inhibiting operation is determined to have been performed, the display indicated in step S62 is displayed on the display 5 and the operation is considered ineffective (step S62). Furthermore, if the prescribed interval elapses thereafter, the routine returns to the BT-AV player reproduction.

During the BT-AV player reproduction (step S60), the controller 101 calls out the submenu controlled by pushing the right soft key 66 and determines as to whether or not the sound output destination setting item screen has been called out (step S66). In the case where the sound output destination setting item screen has not been called out, the BT-AV player reproduction is continued ("No" in step S66).

On the other hand, in the case where the controller 101 decides that the sound output destination setting item screen has been called out, the display described instep S33 of FIG. 8 is displayed on the display 5 (<10> FIG. 8).

(5) BT-AV Connection Terminating Action and BT-AV Connection Standby Action

Referring to FIG. 11, a BT-AV connection terminating action and BT-AV connection standby action will be described. FIG. 11 is a flowchart of the process from the start of BT-AV connection to a BT-AV connection standby action. The BT-AV connection terminating action is performed when (A) an MP terminating action is entered with the key 6 of the mobile phone 1 (moving from step S71) while an MP is playing back music during BT-AV connection (step S60 in FIG. 10), and when (B) a stop operation is performed by the BT-AV device ("Yes" in step S60-4, <11> in FIG. 10) (moving from step S73) while the MP is playing back music during BT-AV connection (step S60 of FIG. 10).

First, (A) when it is determined whether an MP terminating operation is performed with the key 6 of the mobile phone 1 while the MP is playing back music during BT-AV connection (step S60 of FIG. 10) (step S71). If it is determined that the MP terminating operation has been performed ("Yes"), the indicator shown in step S72 is displayed on the display 5 to give the user the option whether to continue the playback in BGM, terminate the playback, or cancel the termination (step S72). If a cancel operation is performed, the BT-AV player playback is restarted. If the playback in the BGM is selected (BGM playback is selected), the indicator on the display 5 returns to a standby screen, and the playback is continued in the BGM (step S74). The process of the BGM playback can be shifted to the BGM stop or BGM pause mode using the key 6, the side key 7, or the electrostatic touchpad 14 even during the playback in the BGM.

On the other hand, if an MP terminating operation is performed (e.g., the power key 71 is pressed) while the indicator shown in step S72 is displayed on the display 5, and if a BGM-playback terminating operation is performed during BGM playback, the music playback action is terminated and also the client or server action in BT-AV connection is terminated (step S73). As described above, even if a stop operation by a BT-AV connectable device is performed during BT-AV player playback (in the case of (B)), the music playback action is terminated and also the client or server action in BT-AV connection is terminated.

It is then determined whether the BT-AV device connected so far can be a client (step S75). A description of the method of determination will be omitted here because it is the same as that of step S49.

If it is determined that the connected BT-AV device can be a client ("Yes" in step S75), the cellular phone 1 starts to wait for BT-AV connection as a server (step S76). Only the BT-AV device waiting for connection may be the BT-AV device that was tried to be connected as a client (in this case, the BT headphone 200), or alternatively, all the BT-AV devices stored in the BT connection list storage 115b (here, including the BT component 300 and other devices in addition to the BT headphone 200) may be set to wait for connection.

It is then determined whether BT-AV connection has been established by the server action (step S77). If it is determined that no connection has been established ("No"), then it is determined whether a specified time has passed from the time the connection wait is started as a server (time out) (step S78). If it is determined that a specified time has not yet elapsed ("No" in step S78), the BT-AV standby screen shown in step S79 is indicated, and the process returns to step S77, where it is determined whether BT-AV connection has been established.

If it is determined in step S77 that BT-AV connection has been established ("Yes"), sound-receiving-device information stored in the sound output setting information storage 115c is rewritten as a connected BT-AV device (step S80). Thereafter, if BGM playback is performed by BT-AV connection, the BGM playback shown in step S74 is performed (moving to <13>).

In contrast, if it is determined in step S78 that a specified time has passed (time-out) ("Yes"), the BT-AV connecting action as a server is terminated (step S82). Then the cellular phone 1 returns to the standby screen (step S83).

If the MP is started, the MP is again started (moving to <12> in FIG. 7), when music is played back in the BGM in step S74, or when the BT-AV-connection standby screen is indicated in step S79, or when music is not played back in the BGM in step S81, or when the standby screen is indicated in step S83.

Alternatively, the BT-AV connection wait operation can be stopped in the BT-AV-connection standby screen in step S79 from a menu other than that of the MP (e.g., a BT setting menu). If the BT-AV connection wait is stopped by the operation, the sound output setting information stored in the sound output setting information storage 115c may be rewritten to an SP/EP. Alternatively, only the BT-AV connection wait operation may be stopped without changing the sound output setting information.

When music is played back with the electrostatic touchpad 14 in the BT-AV connection standby screen in step S79, the BGM playback may be disabled or the BGM playback may be performed in the SP/EP. This prevents the BT-AV connection starting action in the background, allowing the user to easily grasp the condition of operation.

Figure 13:
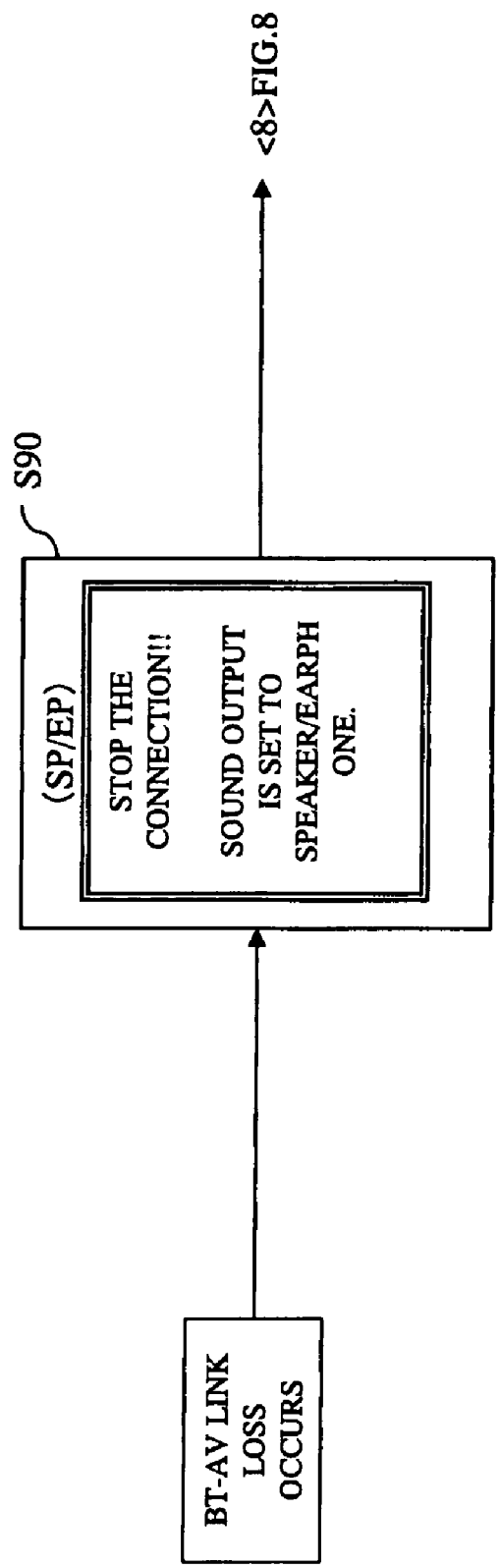
FIG. 13 is a flowchart illustrating a link loss occurred in the embodiment, when the BT-AV connected.

FIG. 13 is an explanatory diagram of a link loss caused during BT-AV connection. The BT-AV link loss occurs when the cellular phone 1 and a BT-AV device (e.g., the BT headphone 200) are apart from each other. Specifically, it may occur when a sound-receiving device is set in step S33 or when the MP is started during the BT-AV connection in step S60. In this case, when the link loss occurs, for example, the indicator shown in step S90 of FIG. 13 is displayed on the display 5, and then the sound output setting information is set to the SP/EP (shift to <8> of FIG. 8).

Although the invention has been described with reference to the cellular phone 1 according to an embodiment, it is to be understood that the invention is not limited to that, but may be applied to other mobile communication devices (e.g., PDAs and PHSs). Also, while BT has been described by way of example, other short-range radio communications and cable communications may be employed. For example, for the short-range radio communications, IrDA and wireless LAN may be used. For the cable communications, LAN interfaces such as RS-232, USB, IEEE1394, and 10Base-T, may be used.

According to an embodiment of the invention, when BT-AV connection cannot be established when a mobile communication device tries the BT-AV connection as a client, such as when a BT-AV device to be connected is at power-off, the device can establish connection as a server. This allows the user to connect to the BT-AV device with a simple operation.

Also, when a BT-AV device that is connected as a sound-receiving device can be a client after a client or server action has ended, the mobile communication device can start to wait for connection (wait for BT-AV connection) in server mode. Accordingly there is no need for the cellular phone 1 to wait for BT-AV connection to a BT-AV device that acts only as a server, so that power consumption can be reduced.

What is claimed is:

1. A mobile communication device for communicating with a radio communication device, the mobile communication device comprising:
a short-range radio communication unit configured to transmit a first request signal for short-range radio communication connection to the radio communication device in a client mode, and configured to receive a second request signal for short-range radio communication connection from the radio communication device in a server mode, the second request signal being necessary for establishing a short range radio communication connection;
a memory configured to store data needed to transmit the first request signal; and
a controller configured (i) to control the mobile communication device to wait in the client mode for establishment of a short-range radio communication connection to the radio communication device in response to the first request signal, (ii) to control the mobile communication device to switch from the client mode to the server mode to wait for the second request signal from the radio communication device in response to a failure to establish a short-range radio communication connection between the mobile communication device and the radio communication device while the mobile communication device is in the client mode, and (iii) to control the mobile communication device such that the mobile communication device does not switch from the client mode to the server mode if a short-range radio communication connection between the mobile communication device and the radio communication device is established when the mobile communication device is in the client mode.

2. The mobile communication device according to claim 1, wherein:
the memory stores information indicating whether or not the radio communication device is capable of transmitting the second request signal to the mobile communication device; and
the controller controls the mobile communication device to switch from the client mode to the server mode to wait for the second request signal from the radio communication device, if the controller determines the radio communication device is capable of transmitting the second request signal to the mobile communication device based on the information.

3. The mobile communication device according to claim 2, wherein the controller is configured to control the mobile communication device to wait in the server mode for the second request signal from the radio communication device for a predetermined time and then to stop waiting for the second request signal.

4. The mobile communication device according to claim 1, wherein the controller is configured to control the mobile communication device to wait in the server mode for the second request signal from the radio communication device for a predetermined time and then to stop waiting for the second request signal.

5. A mobile communication device for communicating with a radio communication device, the mobile communication device comprising:
a short-range radio communication unit configured to transmit a first request signal for short-range radio communication connection to the radio communication device in a client mode, and configured to receive a second request signal for short-range radio communication connection from the radio communication device in a server mode, the second request signal being necessary for establishing a short range radio communication connection;
a memory configured to store music data and setting information, the setting information indicating an output unit to which the music data is to be transmitted;
a reproduction unit configured to reproduce the music data; and
a controller configured (i) to control the mobile communication device to, in the client mode, try to transmit the first request signal to the radio communication device if the reproduction unit is required to reproduce the music data and if the output unit is the radio communication device and to wait in the client mode for establishment of a short-range radio communication connection to the radio communication device in response to the first request signal, (ii) to control the mobile communication device to switch from the client mode to the server mode to wait for the second request signal from the radio communication device in response to a failure to establish a short-range radio communication connection between the mobile communication device and the radio communication device while the mobile communication device is in the client mode, and (iii) to control the mobile communication device such that the mobile communication device does not switch from the client mode to the server mode if a short-range radio communication connection between the mobile communication device and the radio communication device is established when the mobile communication device is in the client mode.

6. The mobile communication device according to claim 5, further comprising:
a speaker;
wherein the reproduction unit is coupled to the speaker, and reproduces the music data via the speaker if the reproduction unit is required to reproduce the music data and if the output unit is the speaker.

7. The mobile communication device according to claim 5, wherein:
the memory stores information indicating whether or not the radio communication device is capable of transmitting the second request signal to the mobile communication device; and
the controller controls the mobile communication device to switch from the client mode to the server mode to wait for the second request signal from the radio communication device, if the controller determines the radio communication device is capable of transmitting the second request signal to the mobile communication device based on the information.

8. The mobile communication device according to claim 7, wherein the controller is configured to control the mobile communication device to wait in the server mode for the second request signal from the radio communication device for a predetermined time and then to stop waiting for the second request signal.

9. The mobile communication device according to claim 5, wherein the controller is configured to control the mobile communication device to wait in the server mode for the second request signal from the radio communication device for a predetermined time and then to stop waiting for the second request signal.

10. A mobile communication device for communicating with a radio communication device, the mobile communication device comprising:
a memory configured to store first data which is transmitted to the radio communication device when a stop operation is executed;
a short-range radio communication unit configured to transmit the first data in response to a stop operation at the mobile communication device, to receive second data which is transmitted from the radio communication device in response to a stop operation at the radio communication device, and to receive a request signal from the radio communication device for short-range radio communication connection in a server mode, the request signal being necessary for establishing a short-range radio communication connection;
a controller configured to control the mobile communication device to wait for the request signal from the radio communication device by switching to the server mode in response to disconnection of the short-range radio communication unit from the radio communication device based on transmitting the first data or receiving the second data.

11. The mobile communication device according to claim 10, wherein:
the memory is configured store a list of devices capable of short-range radio communication; and
the controller controls the mobile communication device to wait in the server mode for the request signal from at least part of the list of devices capable of short-range radio communication stored in the memory.

12. The mobile communication device according to claim 11, wherein:
the memory stores information indicating whether or not the radio communication device is capable of transmitting the request signal to the mobile communication device; and
the controller controls the mobile communication device to switch to wait in the server mode for the request signal from the radio communication device, if the controller determines the radio communication device is capable of transmitting the request signal to the mobile communication device based on the information.

13. The mobile communication device according to claim 12, wherein the controller is configured to control the mobile communication device to wait in the server mode for the request signal from the radio communication device for a predetermined time and then to stop waiting for the request signal.

14. The mobile communication device according to claim 10, wherein:
the memory stores information indicating whether or not the radio communication device is capable of transmitting the request signal to the mobile communication device; and
the controller controls the mobile communication device to switch to wait in the server mode for the request signal from the radio communication device, if the controller determines the radio communication device is capable of transmitting the request signal to the mobile communication device based on the information.

15. The mobile communication device according to claim 14, wherein the controller is configured to control the mobile communication device to wait in the server mode for the request signal from the radio communication device for a predetermined time and then to stop waiting for the request signal.

16. The mobile communication device according to claim 10, wherein the controller is configured to control the mobile communication device to wait in the server mode for the request signal from the radio communication device for a predetermined time and then to stop waiting for the request signal.

* * * * *